United States Patent
Ninomiya

(10) Patent No.: US 9,635,206 B2
(45) Date of Patent: Apr. 25, 2017

(54) IMAGE FORMING APPARATUS AND POWER MODE DISPLAY METHOD

(71) Applicant: KYOCERA Document Solutions Inc., Osaka (JP)

(72) Inventor: Yuichi Ninomiya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/950,898

(22) Filed: Nov. 24, 2015

(65) Prior Publication Data

US 2016/0156799 A1   Jun. 2, 2016

(30) Foreign Application Priority Data

Nov. 28, 2014 (JP) ................................. 2014-241147

(51) Int. Cl.
*H04N 1/00* (2006.01)

(52) U.S. Cl.
CPC ..... *H04N 1/00896* (2013.01); *H04N 1/00904* (2013.01)

(58) Field of Classification Search
CPC ........... H04N 1/00896; H04N 1/00904; H04N 2201/0094
See application file for complete search history.

(56) References Cited

U.S. PATENT DOCUMENTS

| | | | | |
|---|---|---|---|---|
| 5,802,247 A | * | 9/1998 | Ogawa | H04N 5/772 348/211.9 |
| 6,054,981 A | * | 4/2000 | Kimoto | G09G 5/006 345/211 |
| 2006/0007079 A1 | * | 1/2006 | Kim | G09G 3/20 345/83 |
| 2006/0062587 A1 | | 3/2006 | Tanaka | 399/75 |

(Continued)

FOREIGN PATENT DOCUMENTS

| JP | 2004-188880 A | 7/2004 |
|---|---|---|
| JP | 2006-82515 A | 3/2006 |

(Continued)

OTHER PUBLICATIONS

Japanese Office Action dated Jul. 5, 2016, issued by the Japanese Patent Office in corresponding application JP 2014-241147.

*Primary Examiner* — Iriana Cruz

(74) *Attorney, Agent, or Firm* — Stein IP, LLC

(57) ABSTRACT

Provided is an image forming apparatus that stops voltage supply to a display unit and a display control unit in a sleep mode and enables users to recognize a current power mode, with a simple structure. An image forming apparatus includes an operation unit, a main body control unit, and a power supply unit capable of supplying n voltages. The main body control unit includes a switching unit for switching to one of power modes including a ready mode in which n voltages are supplied, and p ($n-m \geq p \geq 1$) sleep modes in which m voltages are not supplied, and one to n-m voltages are supplied. The operation unit includes light emitting (Continued)

elements, n power receiving units for respectively receiving the n voltages, and a light switching circuit for switching between supply and non-supply of the voltage to the light emitting element in accordance with a total number of the received voltages.

10 Claims, 6 Drawing Sheets

(56) References Cited

U.S. PATENT DOCUMENTS

| | | | |
|---|---|---|---|
| 2010/0218021 A1* | 8/2010 | Ma | G06F 1/1684 713/323 |
| 2014/0022588 A1 | 1/2014 | Takeuchi et al. | 358/1.15 |
| 2014/0368856 A1* | 12/2014 | Yoon | H04N 1/00896 358/1.13 |

FOREIGN PATENT DOCUMENTS

| | | |
|---|---|---|
| JP | 2006-194922 A | 7/2006 |
| JP | 2009-15171 A | 1/2009 |

* cited by examiner

FIG.3

| POWER MODE | VOLTAGE | | | | DISPLAY UNIT | DISPLAY CONTROL UNIT | LIGHT EMITTING ELEMENT | | |
| --- | --- | --- | --- | --- | --- | --- | --- | --- | --- |
| | V1 | V2 | V3 | V4 | | | 45a | 45b | 45c |
| FIRST SLEEP MODE SM1 | SUPPLY | STOP | STOP | STOP | STOP | STOP | SUPPLY (ON) | STOP (OFF) | STOP (OFF) |
| SECOND SLEEP MODE SM2 | SUPPLY | SUPPLY | STOP | STOP | STOP | STOP | STOP (OFF) | SUPPLY (ON) | STOP (OFF) |
| THIRD SLEEP MODE SM3 | SUPPLY | SUPPLY | SUPPLY | STOP | STOP | STOP | STOP (OFF) | STOP (OFF) | SUPPLY (ON) |
| READY MODE RM | SUPPLY | SUPPLY | SUPPLY | SUPPLY | SUPPLY | SUPPLY | STOP (OFF) | STOP (OFF) | STOP (OFF) |

FIG.6

| POWER MODE | VOLTAGE | | | DISPLAY UNIT | DISPLAY CONTROL UNIT | LIGHT EMITTING ELEMENT 45a |
|---|---|---|---|---|---|---|
| | V1 | V2 | V3 | | | |
| FIRST SLEEP MODE SM1 | SUPPLY | STOP | STOP | STOP | STOP | SUPPLY (ON) |
| READY MODE RM | SUPPLY | SUPPLY | SUPPLY | SUPPLY | SUPPLY | STOP (OFF) |

IMAGE FORMING APPARATUS AND POWER MODE DISPLAY METHOD

INCORPORATION BY REFERENCE

This application is based upon and claims the benefit of priority from the corresponding Japanese Patent Application No. 2014-241147 filed Nov. 28, 2014, the entire contents of which are hereby incorporated by reference.

BACKGROUND

The present disclosure relates to an image forming apparatus and particularly to a technique for allowing a user to recognize the current power mode.

Conventionally, there is known an image forming apparatus having a plurality of power modes with different power consumption. For instance, there is already known a multifunction peripheral having a power save mode in which power consumption is reduced. In addition, in this multifunction peripheral, even if there is a factor indicating a certain warning, the multifunction peripheral becomes the power save mode when a request to switch to the power save mode is issued, and a display unit displays a message indicating there is a warning.

Further, in recent years, in a so-called sleep mode in which power consumption is reduced like the power save mode described above, it is required to reduce power consumption as much as possible. Accordingly, there is also known an image forming apparatus having a plurality of sleep modes with different degrees of saving power consumption. In this image forming apparatus, the power mode is appropriately switched to one of the sleep modes in accordance with a use situation of the apparatus, so that power consumption is reduced as much as possible in accordance with the use situation of the apparatus.

The above-mentioned image forming apparatus having a plurality of sleep modes controls a display unit to display information indicating a current power mode even if the power mode is the sleep mode, in order that a user can recognize the current power mode. However, this image forming apparatus has a problem that it is impossible to stop voltage supply to an operation unit equipped with a display control unit such as an ASIC for controlling the display unit and information display on the display unit when the power mode is the sleep mode.

In order to solve this problem, there is known a method in which a light emitting element such as an LED is provided to the operation unit, and further a control line is disposed between a main body control unit that integrally controls the entire apparatus and the operation unit. In this image forming apparatus, when the power mode is the sleep mode, voltage supply to the operation unit is stopped, and a voltage is supplied only to the main body control unit. Then, the main body control unit controls on/off state of the light emitting element via the control line. Thus, when the power mode is the sleep mode, voltage supply to the display unit and the display control unit is stopped. However, in this image forming apparatus, because it is necessary to dispose the control line between the main body control unit and the operation unit, a structure of the image forming apparatus may be complicated.

SUMMARY

An image forming apparatus according to an aspect of the present disclosure includes an operation unit including a display unit and a display control unit configured to control information display on the display unit, an image forming unit configured to form an image on a paper sheet, a main body control unit configured to control operations of the image forming unit and the operation unit, and a power supply unit capable of individually supplying two or more, i.e., n voltages. The main body control unit includes a switching unit configured to switch a power mode of the image forming apparatus to one of power modes including a ready mode in which the power supply unit supplies the n voltages, and one or more to n−m or less, i.e., p sleep modes in which the power supply unit does not supply the one or more and less than n, i.e., m voltages used by the display unit and the display control unit when the power mode is the ready mode while the power supply unit supplies one or more to n−m or less different number of voltages. The operation unit includes a light emitting element, n power receiving units configured to respectively receive the n voltages, and a light switching circuit configured to switch between supply and stop of the received voltage to the light emitting element in accordance with a total number of the voltages received by the n power receiving units.

In this structure, when the current power mode is one of the p sleep modes, supply of the voltages used by the display unit and the display control unit when the power mode is the ready mode is stopped.

In addition, because the number of voltages to be supplied is different among the ready mode and the p sleep modes, the total number of the voltages received by the n power receiving units is different depending on which power mode the current power mode is. In this way, the light switching circuit can switch between supply and non-supply of the voltage to the light emitting element in accordance with the total number of the voltages received by the n power receiving units, namely, depending on which power mode the current power mode is.

In contrast, there is considered a structure in which a control line is disposed between the operation unit and the main body control unit, and the main body control unit switches between supply and non-supply of the voltage to the light emitting element via the control line in accordance with the current power mode (hereinafter referred to as Structure A). However, compared with the Structure A, this structure enables to switch between supply and non-supply of the voltage to the light emitting element in accordance with the current power mode with a simple structure without the control line.

A method of displaying a power mode according to another aspect of the present disclosure includes the steps of allowing the image forming apparatus to have a plurality of power modes including a ready mode in which the power supply unit supplies n voltages and p sleep modes in which the power supply unit does not supply one or more of the n voltages, disposing p light emitting elements associated respectively to the p sleep modes in an operation unit of the image forming apparatus, and supplying a voltage received by a power receiving unit only to a light emitting element to emit light, corresponding to a sleep mode in which the power supply unit supplies voltages of the same number as the total number of the voltages received by n power receiving units, among the p light emitting elements.

BRIEF DESCRIPTION OF THE DRAWINGS

FIG. 3 is a diagram showing a correspondence relationship among voltage supply states in power modes and states of power supply to individual units.

FIG. 6 is a diagram showing a correspondence relationship among voltage supply states in power modes and states of power supply to individual units in a modified embodiment.

DETAILED DESCRIPTION

Now, an embodiment of an image forming apparatus according to the present disclosure is described with reference to the drawings. In this embodiment, a copier is exemplified as the image forming apparatus. However, this is not a limitation, and the image forming apparatus may be a printer, a facsimile apparatus, or a multifunction peripheral, for example.

Figure 1:
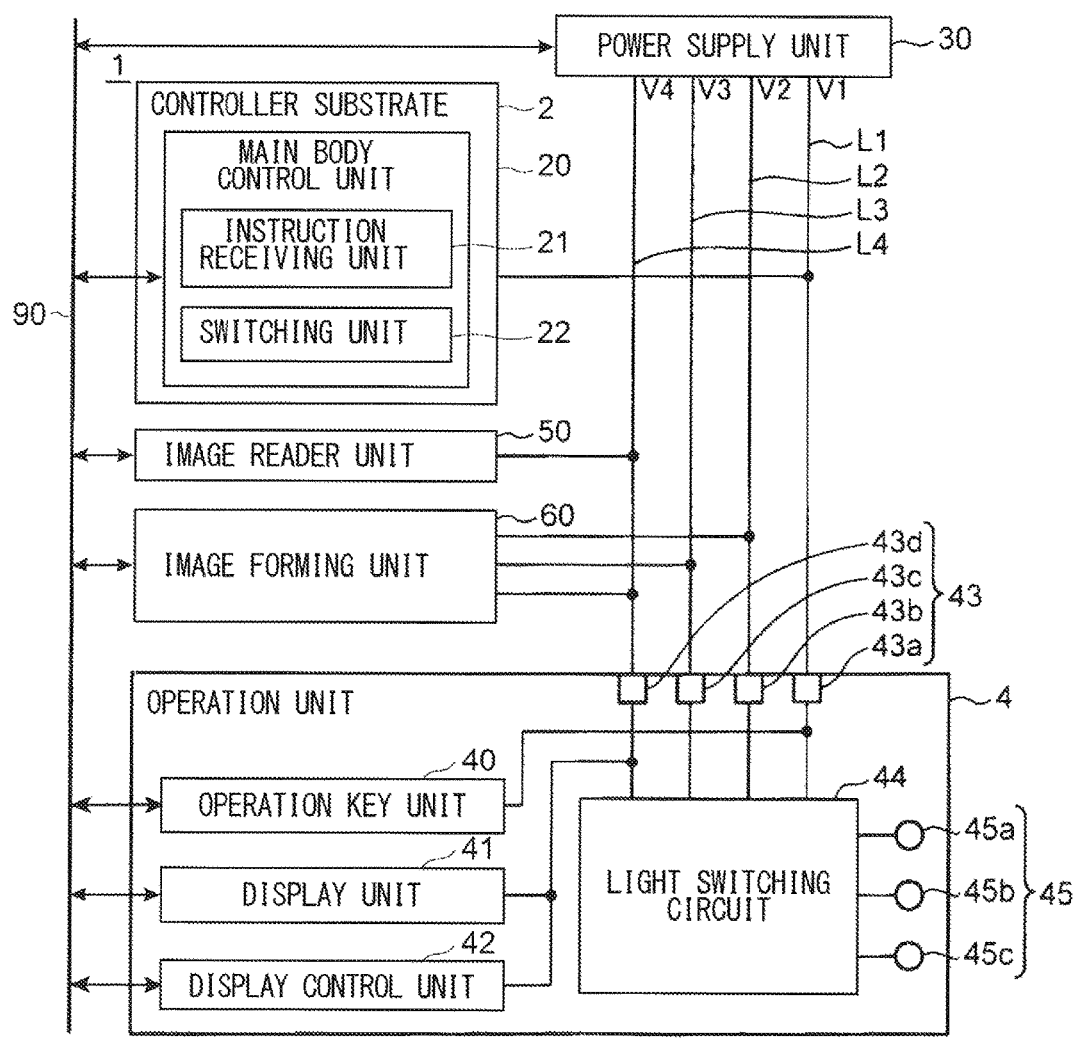
FIG. 1 is a block diagram showing an electric structure according to an embodiment of an image forming apparatus according to the present disclosure.

FIG. 1 is a block diagram showing an electric structure of a copier 1 according to an embodiment of an image forming apparatus according to the present disclosure. As shown in FIG. 1, the copier 1 includes four power supply lines L1 to L4, a power supply unit 30, an image reader unit 50, an image forming unit 60, a control line 90, an operation unit 4, and a controller substrate 2.

The power supply unit 30 individually supplies four (n) DC voltages (the voltages) using the four power supply lines L1 to L4. Specifically, the power supply unit 30 includes a power switch (not shown), an AC to DC converter (not shown), and three switch elements (not shown).

The power switch is switched between on and off by a user's operation. When the power switch is turned on, the power switch electrically connects an external power supply with the AC to DC converter. When the power switch is turned on so that an AC voltage is supplied from the external power supply, the AC to DC converter converts the AC voltage into a DC voltage having a predetermined level. Each of the three switch elements is connected between each of the power supply lines L2 to L4 and the AC to DC converter. Each of the switch elements is turned on and off under control by a switching unit 22 described later.

When the switch element is turned on, the switch element electrically connects the AC to DC converter with the power supply line connected to the switch element. In this way, the DC voltage output from the AC to DC converter is supplied via the power supply line. For instance, when the switch element connected to the power supply line L4 is turned on, the DC voltage output from the AC to DC converter is supplied via the power supply line L4.

On the other hand, when the switch element is turned off, the switch element cuts off the electric connection between the AC to DC converter and the power supply line connected to the switch element. In this way, the DC voltage output from the AC to DC converter is not supplied via the power supply line. For instance, when the switch element connected to the power supply line L4 is turned off, the DC voltage output from the AC to DC converter is not supplied via the power supply line L4.

In addition, no switch element is disposed in the power supply line L1, and hence the AC to DC converter is always electrically connected with the power supply line L1. In this way, the DC voltage output from the AC to DC converter is always supplied via the power supply line L1.

Hereinafter, the DC voltage supplied individually via the power supply line L1 is referred to as voltage V1. In the same manner, the DC voltages supplied individually via the power supply lines L2, L3, and L4 are referred to as voltages V2, V3, and V4, respectively.

The image reader unit 50 is provided with an optical system unit (not shown) including a charge coupled device (CCD) line sensor, an exposing lamp, and the like. The optical system unit outputs image data obtained by scanning a document placed on a document table (not shown) to a main body control unit 20 under control by the main body control unit 20 described later. The image reader unit 50 is operated using the voltage V4.

The image forming unit 60 performs an image forming operation in which an image of the image data received from the main body control unit 20 is formed on a paper sheet under control by the main body control unit 20 described later. Specifically, the image forming unit 60 has a known structure including a photosensitive drum, a charging unit, an exposing unit, a developing unit, a transferring unit, a fixing unit, and the like. The image forming unit 60 is operated using three voltages V2, V3, and V4.

For instance, the fixing unit includes a heating roller for heating the paper sheet. A heater for heating the heating roller is disposed inside the heating roller. The heater uses the three voltages V2, V3, and V4 for heating the heating roller to be a predetermined fixing temperature during the image forming operation.

When supply of one or more voltages among the three voltages V2, V3, and V4 are stopped, the heater cannot sufficiently heat the heating roller to the fixing temperature because a small number of voltages are supplied. In this case, when the image forming operation is performed next, the three voltages V2, V3, and V4 are supplied to the heater again, and it takes time to heat the heating roller until it becomes the fixing temperature. In other words, the larger the number of voltages that are not supplied is, the more the power consumption of the image forming unit 60 can be reduced, but the longer time is necessary for heating the heating roller until the fixing temperature when the image forming operation is performed next.

The operation unit 4 includes three (p) light emitting elements 45a to 45c such as LEDs, which are supplied with voltage to emit light. In addition, the operation unit 4 includes four power receiving units 43a to 43d, an operation key unit 40, a display unit 41, a display control unit 42, and a light switching circuit 44.

The three light emitting elements 45a to 45c are disposed at positions where the user can see the three light emitting elements 45a to 45c from outside of the copier 1. Three light emitting elements 45a to 45c are disposed corresponding to three sleep modes SM1, SM2, and SM3, respectively, which are described later. Specifically, a label indicating the first sleep mode SM1 described later is attached to a vicinity of the light emitting element 45a. In this way, the light emitting element 45a and the first sleep mode SM1 are associated to each other. In the same manner, a label indicating the second sleep mode SM2 described later is attached to a vicinity of the light emitting element 45b, and a label indicating the third sleep mode SM3 described later is attached to a vicinity of the light emitting element 45c.

The power receiving unit 43a is connected to the power supply line L1 so as to receive the voltage V1 supplied via the power supply line L1. In the same manner, the power receiving units 43b, 43c, and 43d are respectively connected to the power supply lines L2, L3, and L4 so as to receive the voltages V2, V3, and V4 supplied via the power supply lines L2, L3, and L4, respectively.

The operation key unit 40 is disposed for the user to input various instructions to the copier 1. Specifically, the operation key unit 40 includes various keys such as a start key for inputting a start instruction to start a predetermined operation such as copying to the copier 1 and a ten key. The operation key unit 40 uses the voltage V1 so as to detect a key operated by the user and to transmit identification information of the detected key to the main body control unit 20 described later via the control line 90.

The display unit 41 is a liquid crystal display or the like and uses one (m) voltage V4 so as to display various information under control by the display control unit 42.

The display control unit 42 is a microcomputer including a CPU, registers, and the like, for example, and receives a display command and display data output from the main body control unit 20 via the control line 90 described later. The display control unit 42 executes the received display command using the received display data. In this way, the display control unit 42 controls the display unit 41 to display information indicated by the display data. The display control unit 42 uses one (m) voltage V4 to operate. Note that the display unit 41 and the display control unit 42 may use different voltages to operate.

Figure 2:
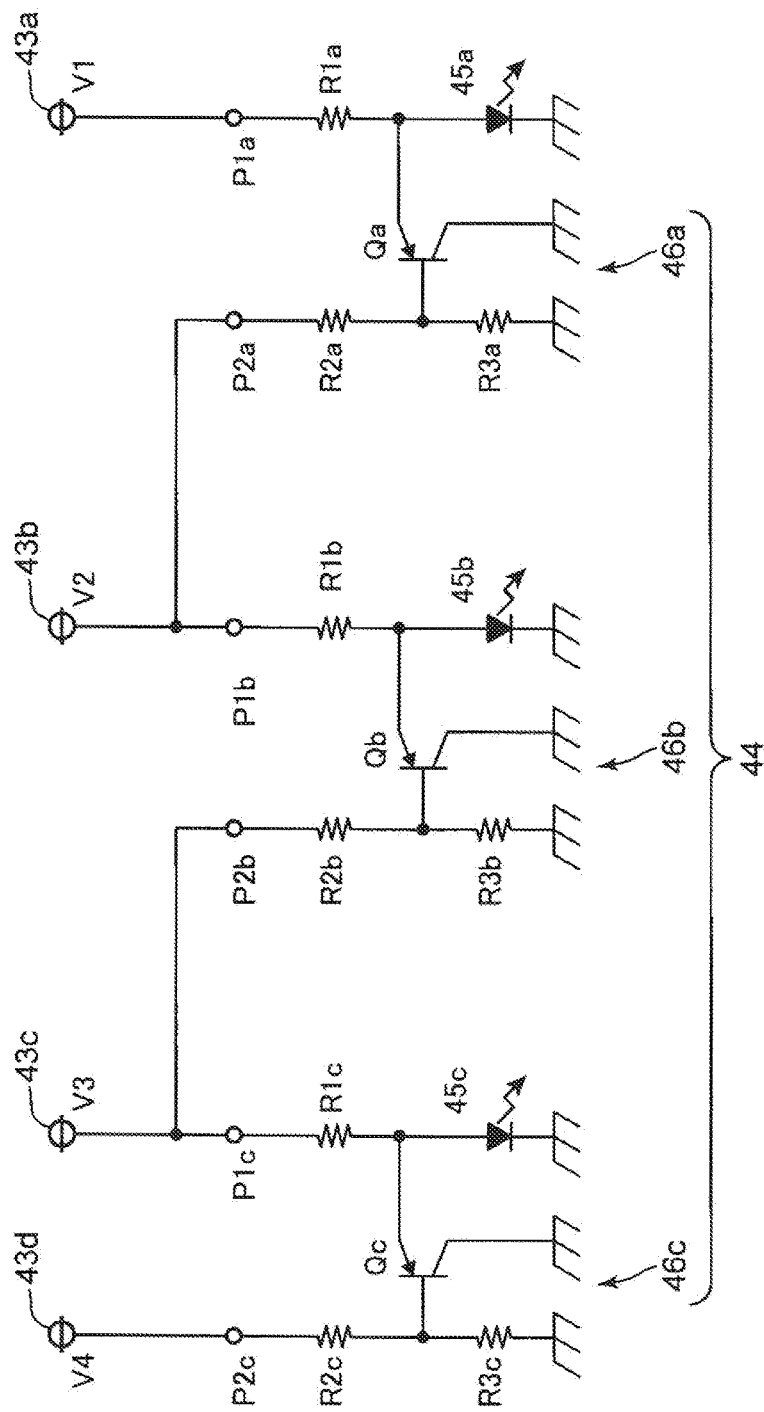
FIG. 2 is a circuit diagram of a light switching circuit.

The light switching circuit 44 switches between supply and non-supply of the received voltage to the three light emitting elements 45a to 45c in accordance with the total number of voltages received by the four power receiving units 43a to 43d. FIG. 2 is a circuit diagram of the light switching circuit 44. Specifically, the light switching circuit 44 includes three power supply switching circuits 46a to 46c corresponding to the three light emitting elements 45a to 45c, respectively, as shown in FIG. 2.

The power supply switching circuit 46a includes a first power receiving unit P1a, a second power receiving unit P2a, a switch element Qa, and three resistors R1a, R2a, and R3a.

The first power receiving unit P1a is connected to the power receiving unit 43a and receives the voltage V1 when the power receiving unit 43a receives the voltage V1. In addition, the first power receiving unit P1a is connected in series to the light emitting element 45a via the resistor R1a.

The second power receiving unit P2a is connected to the power receiving unit 43b and receives the voltage V2 when the power receiving unit 43b receives the voltage V2. The second power receiving unit P2a is connected to the two resistors R2a and R3a connected in series.

The switch element Qa is a PNP transistor, for example, and is connected in parallel to the light emitting element 45a corresponding to the power supply switching circuit 46a. In addition, a base thereof is connected to the second power receiving unit P2a via the resistor R2a.

The power supply switching circuit 46b has a structure similar to that of the power supply switching circuit 46a and includes a first power receiving unit P1b similar to the first power receiving unit P1a, a second power receiving unit P2b similar to the second power receiving unit P2a, a switch element Qb similar to the switch element Qa, and three resistors R1b, R2b, and R3b similar to the three resistors R1a, R2a, and R3a.

The first power receiving unit P1b is connected to the power receiving unit 43b unlike the first power receiving unit P1a. In other words, the first power receiving unit P1b receives the voltage V2 when the power receiving unit 43b receives the voltage V2. In addition, the second power receiving unit P2b is connected to the power receiving unit 43c unlike the second power receiving unit P2a. In other words, the second power receiving unit P2b receives the voltage V3 when the power receiving unit 43c receives the voltage V3.

The power supply switching circuit 46c has a structure similar to that of the power supply switching circuit 46a and includes a first power receiving unit P1c similar to the first power receiving unit P1a, a second power receiving unit P2c similar to the second power receiving unit P2a, a switch element Qc similar to the switch element Qa, and three resistors R1c, R2c, and R3c similar to the three resistors R1a, R2a, and R3a.

The first power receiving unit P1c is connected to the power receiving unit 43c unlike the first power receiving unit P1a. In other words, the first power receiving unit P1c receives the voltage V3 when the power receiving unit 43c receives the voltage V3. In addition, the second power receiving unit P2c is connected to the power receiving unit 43d unlike the second power receiving unit P2a. In other words, the second power receiving unit P2c receives the voltage V4 when the power receiving unit 43d receives the voltage V4.

Operations of the three power supply switching circuits 46a to 46c will be described later.

The controller substrate 2 includes the main body control unit 20 and the like. The controller substrate 2 is always supplied with the voltage V1 via the power supply line L1 during a period while the power switch is on.

The main body control unit 20 is configured to include, for example, a central processing unit (CPU) for executing a predetermined operational processing, a nonvolatile memory such as an electrically erasable and programmable read only memory (EEPROM) storing a predetermined control program, a random access memory (RAM) for temporarily storing data, a peripheral circuits of them, and the like. The main body control unit 20 operates using the voltage V1 supplied to the controller substrate 2.

The main body control unit 20 performs the control program stored in the nonvolatile memory so as to communicate with the power supply unit 30, the operation key unit 40, the display control unit 42, the image reader unit 50, and the image forming unit 60 via the control line 90 for controlling operations of the units. The main body control unit 20 operates as an instruction receiving unit 21 and the switching unit 22, for example.

When receiving identification information of a key from the operation key unit 40 via the control line 90, the instruction receiving unit 21 accepts an instruction corresponding to the key identified by the identification information. Details of the instruction receiving unit 21 will be described later.

The switching unit 22 switches a power mode of the copier 1 to one of power modes including a ready mode in which the power supply unit 30 supplies the four voltages V1 to V4, and one or more to three (n−m) or less, i.e., three (p) sleep modes in which the power supply unit 30 does not supply the voltage V4 used by the display unit 41 and the display control unit 42 when the power mode is the ready mode while the power supply unit 30 supplies one or more to three (n−m) or less different number of voltages.

FIG. 3 is a diagram showing a correspondence relationship among voltage supply states in power modes and states of power supply to individual units. Specifically, as shown in FIG. 3, the switching unit 22 switches the power mode of the copier 1 to one of the power modes including the three sleep modes including the first sleep mode SM1 in which the power supply unit 30 supplies the one voltage V1, the second sleep mode SM2 in which the power supply unit 30 supplies the two voltages V1 and V2, and the third sleep mode SM3 in which the power supply unit 30 supplies the three voltages V1 to V3, and the ready mode RM in which the power supply unit 30 supplies the four voltages V1 to V4.

When the power mode of the copier 1 is switched to one of the first sleep mode SM1, the second sleep mode SM2, and the third sleep mode SM3, the power supply unit 30 does not supply the voltage V4. In this case, as shown in a part surrounded by a broken line in FIG. 3, the display unit 41 and the display control unit 42 become a state where supply of the voltage V4 is stopped. On the other hand, when the power mode of the copier 1 is switched to the ready mode RM, the power supply unit 30 supplies the voltage V4. In this case, as shown in a part surrounded by a dashed dotted line in FIG. 3, the display unit 41 and the display control unit 42 become a state where the voltage V4 is supplied.

Figure 4:
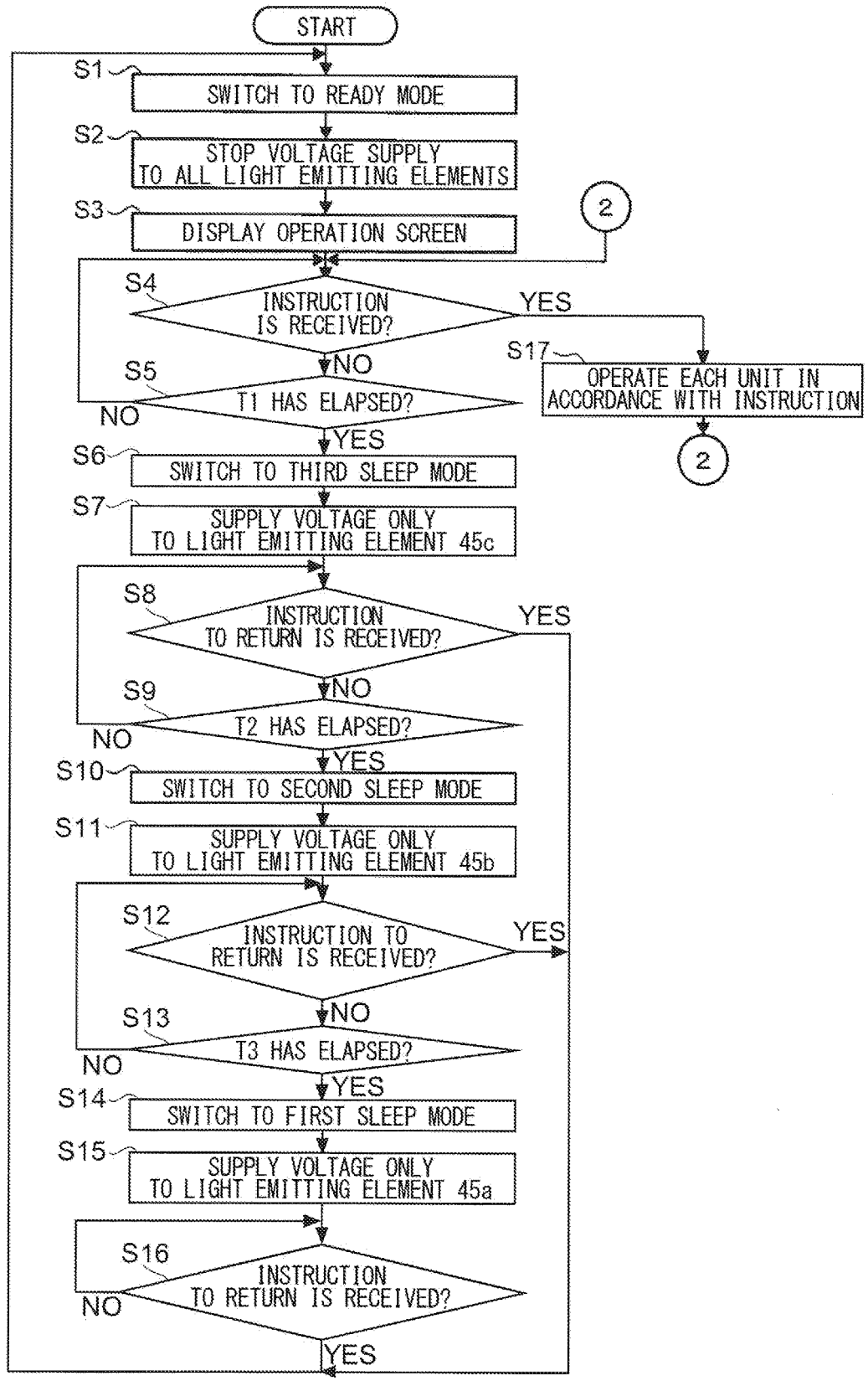
FIG. 4 is a flowchart showing a power mode switching operation.

Hereinafter, the switching operation of the power mode performed by the switching unit 22 is described. In this description, details of the three power supply switching circuits 46a to 46c and the instruction receiving unit 21 are described. FIG. 4 is a flowchart showing the switching operation of the power mode.

As shown in FIG. 4, when the power switch is turned on so that the power supply unit 30 supplies the voltage V1 via the power supply line L1, the switching unit 22 switches the power mode of the copier 1 to the ready mode RM (FIG. 3) (S1).

Specifically, in Step S1, the switching unit 22 transmits to a control signal indicating an instruction to turn on the switch elements connected respectively to the power supply lines L2 to L4, to the power supply unit 30 via the control line 90. When receiving the control signal, the power supply unit 30 turns on the switch elements connected respectively to the power supply lines L2 to L4 in accordance with the instruction indicated by the control signal. In this way, the power supply unit 30 supplies the four voltages V1 to V4 via the power supply lines L1 to L4. Thus, the switching unit 22 switches the power mode of the copier 1 to the ready mode RM in which the four voltages V1 to V4 are supplied.

When the power mode of the copier 1 is switched to the ready mode RM, the four power receiving units 43a to 43d receive the four voltages V1 to V4. In this case, the light switching circuit 44 stops supply of the voltage to the three light emitting elements 45a to 45c as shown in FIG. 3 (S2). As a result, the three light emitting elements 45a to 45c are turned off.

Hereinafter, with reference to FIG. 2, the operation of the light switching circuit 44 in Step S2, namely the operations of the three power supply switching circuits 46a to 46c are described in detail.

In the power supply switching circuit 46a, the first power receiving unit P1a receives the voltage V1 via the power receiving unit 43a, and the second power receiving unit P2a receives the voltage V2 via the power receiving unit 43b. In this way, the voltage V2 received by the second power receiving unit P2a is divided by the two resistors R2a and R3a, and the divided voltage is applied to a base of the switch element Qa so that the switch element Qa is turned on to allow current flow. As a result, the current flowing when the first power receiving unit P1a receives the voltage V1 flows to a ground via the resistor R1a and the switch element Qa, while the current does not flow to the light emitting element 45a. In this way, the power supply switching circuit 46a stops voltage supply to the light emitting element 45a.

In the power supply switching circuit 46b, similarly to the power supply switching circuit 46a, the first power receiving unit P1b receives the voltage V2 via the power receiving unit 43b, and the second power receiving unit P2b receives the voltage V3 via the power receiving unit 43c. As a result, the switch element Qb is turned on allowing current flow, and the current flowing when the first power receiving unit P1b receives the voltage V2 flows to the ground via the resistor R1b and the switch element Qb, while the current does not flow to the light emitting element 45b. In this way, the power supply switching circuit 46b stops voltage supply to the light emitting element 45b.

In the power supply switching circuit 46c, similarly to the power supply switching circuits 46a and 46b, the first power receiving unit P1c receives the voltage V3 via the power receiving unit 43c, and the second power receiving unit P1c receives the voltage V4 via the power receiving unit 43d. Thus, the switch element Qc is turned on allowing current flow, and the current flowing when the first power receiving unit P1c receives the voltage V3 flows to the ground, while the current does not flow to the light emitting element 45c. In this way, the power supply switching circuit 46c stops voltage supply to the light emitting element 45c.

Figure 5:
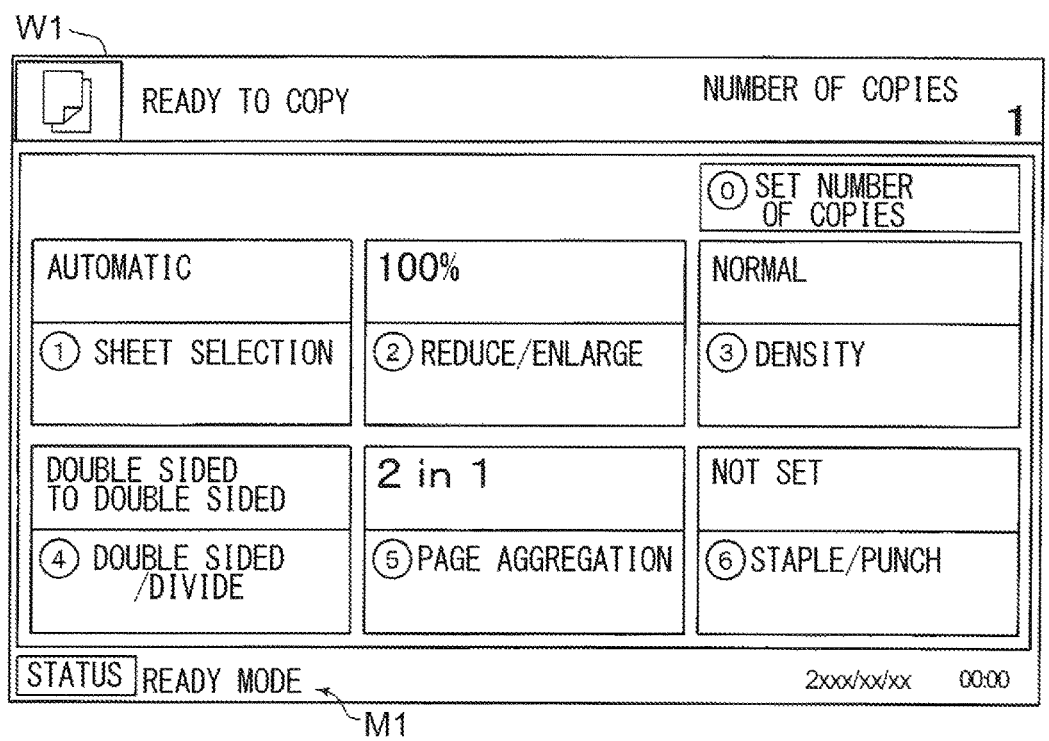
FIG. 5 is a diagram showing an operation screen of a copy function.

FIG. 5 is a diagram showing an operation screen W1 of a copy function. When the power mode of the copier 1 is switched to the ready mode RM, the main body control unit 20 transmits the image data stored in the nonvolatile memory indicating the operation screen W1 of the copy function shown in FIG. 5 and the display command for the display unit 41 to display the image data to the display control unit 42 via the control line 90. In this way, the display control unit 42 executes the received display command using the received screen data so that the display unit 41 displays the operation screen W1 of the copy function shown in FIG. 5 (S3).

As shown in FIG. 5, the operation screen W1 includes a message M1 indicating that the current power mode is the ready mode RM. In addition, circled numerals corresponding respectively to execution conditions of the copy function are displayed in the operation screen W1. For instance, a circled numeral "1" is displayed corresponding to an execution condition of selecting a paper sheet on which an image is formed (hereinafter referred to as a paper sheet selection condition).

When the power mode is the ready mode RM, it is supposed that a predetermined time T1 has elapsed (YES in S5) without an operation of the operation key unit 40 by the user, i.e., without any instruction received by the instruction receiving unit 21 (NO in S4). In this case, the switching unit 22 switches the power mode to the third sleep mode SM3 (FIG. 3) (S6).

Specifically, in Step S6, the switching unit 22 transmits a control signal indicating an instruction to turn off the switch element connected to the power supply line L4 to the power supply unit 30 via the control line 90. When receiving the control signal, the power supply unit 30 turns off the switch element connected to the power supply line L4 in accordance with the instruction indicated by the control signal. In this way, the power supply unit 30 stops supply of the voltage V4. As a result, the display unit 41 and the display control unit 42 do not operate, and hence the operation screen W1 displayed on the display unit 41 in Step S3 becomes not to be displayed. In this way, the switching unit 22 switches the power mode to the third sleep mode SM3 in which the three voltages V1 to V3 are supplied.

When the power mode is switched to the third sleep mode SM3, the three power receiving units 43a to 43c receive the three voltages V1 to V3. In this case, as shown in FIG. 3, the light switching circuit 44 stops voltage supply to the two light emitting elements 45a and 45b and supplies the voltage only to the one light emitting element 45c (S7). As a result, among the three light emitting elements 45a to 45c, only the light emitting element 45c corresponding to the third sleep mode SM3 is turned on.

Hereinafter, with reference to FIG. 2, operations of the three power supply switching circuits 46a to 46c in Step S7 are described. In the power supply switching circuit 46a, similarly to Step S2, the first power receiving unit P1a receives the voltage V1, and the second power receiving unit P2a receives the voltage V2. As a result, the power supply switching circuit 46a stops the voltage supply to the light emitting element 45a by an operation similar to Step S2. Also in the power supply switching circuit 46b, similarly to Step S2, the first power receiving unit P1b receives the voltage V2, and the second power receiving unit P2b receives the voltage V3. As a result, the power supply switching circuit 46b stops voltage supply to the light emitting element 45b by an operation similar to Step S2.

On the other hand, in the power supply switching circuit 46c, the first power receiving unit P1c receives the voltage V3, but the second power receiving unit P2c does not receive the voltage V4. In this way, a voltage is not applied to a base of the switch element Qc, and hence the switch element Qc is turned off. As a result, the current flowing when the first power receiving unit P1c receives the voltage V3 does not flow to the switch element Qc via the resistor R1c but flows to the light emitting element 45c via the resistor R1c. In this way, the power supply switching circuit 46c supplies the voltage V3 received by the first power receiving unit P1c to the light emitting element 45c via the resistor R1c.

In other words, in the power supply switching circuit 46c, the first power receiving unit P1c is connected to the power receiving unit 43c so as to receive the voltage V3 (first voltage), which is supplied both in the third sleep mode SM3 (first power mode) corresponding to the light emitting element 45c corresponding to the power supply switching circuit 46c and in the ready mode RM (second power mode) having the number of voltages supplied from the power supply unit 30 that is large next to the number of voltages supplied in the third sleep mode SM3. On the other hand, the second power receiving unit P2c is connected to the power receiving unit 43d so as to receive the voltage V4 (second voltage) that is supplied in the ready mode RM but is not supplied in the third sleep mode SM3.

When the power mode is the third sleep mode SM3, it is supposed that a predetermined time T2 has elapsed (YES in S9) without any instruction to return to the ready mode RM received by the instruction receiving unit 21 (NO in S8). In this case, the switching unit 22 switches the power mode to the second sleep mode SM2 (FIG. 3) (S10).

The instruction to return to the ready mode RM is an instruction for making the switching unit 22 switch the power mode of the copier 1 to the ready mode RM. Specifically, when the power mode of the copier 1 is one of the third sleep mode SM3, the second sleep mode SM2, and the first sleep mode SM1, it is supposed that one of keys of the operation key unit 40 is operated by the user. In this case, the instruction receiving unit 21 receives the instruction to return to the ready mode RM even if the key identified by the identification information received via the control line 90 is any key.

In Step S10, the switching unit 22 transmits a control signal indicating an instruction to turn off the switch element connected to the power supply line L3, to the power supply unit 30 via the control line 90. When receiving the control signal, the power supply unit 30 turn off the switch element connected to the power supply line L3 in accordance with an instruction indicated by the control signal. In this way, the power supply unit 30 stops supply of the voltage V3. In this way, the switching unit 22 switches the power mode to the second sleep mode SM2 in which two voltages V1 to V2 are supplied.

When the power mode is switched to the second sleep mode SM2, the two power receiving units 43a and 43b receive two voltages V1 and V2. In this case, as shown in FIG. 3, the light switching circuit 44 stops voltage supply to the two light emitting elements 45a and 45c and supplies the voltage only to the one light emitting element 45b (S11). As a result, among the three light emitting elements 45a to 45c, only the light emitting element 45b associated to the second sleep mode SM2 is turned on.

Hereinafter, with reference to FIG. 2, operations of the three power supply switching circuits 46a to 46c in Step S11 are described in detail. In the power supply switching circuit 46a, similarly to Step S2, the first power receiving unit P1a receives the voltage V1, and the second power receiving unit P2a receives the voltage V2. Thus, the power supply switching circuit 46a stops voltage supply to the light emitting element 45a by the operation similar to Step S2.

In the power supply switching circuit 46b, the first power receiving unit P1b receives the voltage V2, but the second power receiving unit P2b does not receive the voltage V3. In this way, a voltage is not applied to a base of the switch element Qb, and hence the switch element Qb is turned off. As a result, the current flowing when the first power receiving unit P1b receives the voltage V2 flows to the light emitting element 45b via the resistor R1b. In this way, the power supply switching circuit 46b supplies the voltage V2 received by the first power receiving unit P1b to the light emitting element 45b via the resistor R1b.

In other words, in the power supply switching circuit 46b, the first power receiving unit P1b is connected to the power receiving unit 43b so as to receive the voltage V2 (first voltage), which is supplied both in the second sleep mode SM2 (first power mode) corresponding to the light emitting element 45b corresponding to the power supply switching circuit 46b and in the third sleep mode SM3 (second power mode) having the number of voltages supplied from the power supply unit 30 that is large next to the number of voltages supplied in the second sleep mode SM2. On the other hand, the second power receiving unit P2b is connected to the power receiving unit 43c so as to receive the voltage V3 (second voltage) that is supplied in the third sleep mode SM3 but is not supplied in the second sleep mode SM2.

In the power supply switching circuit 46c, the first power receiving unit P1c does not receive the voltage V3, and the second power receiving unit P2c also does not receive the voltage V4. In other words, the power supply switching circuit 46c does not receive any voltage to be supplied to the light emitting element 45c, so as to stop voltage supply to the light emitting element 45c.

When the power mode is the second sleep mode SM2, it is supposed that a predetermined time T3 has elapsed (YES in S13) without any instruction to return to the ready mode RM received by the instruction receiving unit 21 (NO in S12). In this case, the switching unit 22 switches the power mode to the first sleep mode SM1 (FIG. 2) (S14).

Specifically, in Step S14, the switching unit 22 transmits a control signal indicating an instruction to turn off the switch element connected to the power supply line L2, to the power supply unit 30 via the control line 90. When receiving the control signal, the power supply unit 30 turns off the switch element connected to the power supply line L2 in accordance with the instruction indicated by the control signal. In this way, the power supply unit 30 stops supply of the voltage V2. In this way, the switching unit 22 switches the power mode to the first sleep mode SM1 in which the one voltage V1 is supplied.

When the power mode is switched to first sleep mode SM1, the one power receiving unit 43a receives the one voltage V1. In this case, as shown in FIG. 3, the light switching circuit 44 stops voltage supply to the two light emitting elements 45b and 45c and supplies the voltage only to the one light emitting element 45a (S15). As a result, among three light emitting elements 45a to 45c, only the light emitting element 45a associated to the first sleep mode SM1 is turned on.

Hereinafter, with reference to FIG. 2, operations of the three power supply switching circuits 46a to 46c in Step S15 are described in detail. In the power supply switching circuit 46a, the first power receiving unit P1a receives the voltage V1, but the second power receiving unit P2a does not receive the voltage V2. In this way, a voltage is not applied to a base of the switch element Qa, and the switch element Qa is turned off. As a result, the current flowing when the first power receiving unit P1a receives the voltage V1 flows to the light emitting element 45a via the resistor R1a. In this way, the power supply switching circuit 46a supplies the voltage V1 received by the first power receiving unit P1a to the light emitting element 45a via the resistor R1a.

In other words, in the power supply switching circuit 46a, the first power receiving unit P1a is connected to the power receiving unit 43a so as to receive the voltage V1 (first voltage), which is supplied both in the first sleep mode SM1 (first power mode) corresponding to the light emitting element 45a corresponding to the power supply switching circuit 46a and in the second sleep mode SM2 (second power mode) having the number of voltages supplied from the power supply unit 30 is large next to the number of voltages supplied in the first sleep mode SM1. On the other hand, the second power receiving unit P2a is connected to the power receiving unit 43b so as to receive the voltage V2 (second voltage) that is supplied in the second sleep mode SM2 but is not supplied in the first sleep mode SM1.

In the power supply switching circuit 46b, the first power receiving unit P1b does not receive the voltage V2, and the second power receiving unit P2b also does not receive the voltage V3. In other words, the power supply switching circuit 46b does not receive any voltage to be supplied to the light emitting element 45b so as to stop voltage supply to the light emitting element 45b. In the power supply switching circuit 46c, similarly to Step S11, the first power receiving unit P1c does not receive the voltage V3, and the second power receiving unit P2c also does not receive the voltage V4. In other words, similarly to Step S11, the power supply switching circuit 46c does not receive any voltage to be supplied to the light emitting element 45c so as to stop voltage supply to the light emitting element 45c.

On the other hand, in the case where the power mode is the ready mode RM, when the instruction receiving unit 21 receives a certain instruction (YES in S4), the main body control unit 20 controls the individual units to operate in accordance with the instruction received by the instruction receiving unit 21 (S17). After performing Step S17, the process of Step S4 and the following steps is repeated.

For instance, it is supposed that a ten key for inputting one of the circled numerals displayed on the operation screen W1 (FIG. 5) displayed in Step S3 is pressed in Step S4 so that the instruction receiving unit 21 receives the identification information of the ten key. In this case, the instruction receiving unit 21 receives an instruction to display a setting screen of a copy function execution condition corresponding to the numeral corresponding to the ten key as an instruction corresponding to the ten key identified by the identification information.

For instance, when a ten key for inputting numeral "1" is pressed, the instruction receiving unit 21 receives an instruction to display the setting screen of the paper sheet selection condition corresponding to numeral "1" as the instruction corresponding to the ten key.

In this case, in Step S17, the main body control unit 20 transmits image data indicating the setting screen stored in the nonvolatile memory and the display command for displaying the image data on the display unit 41 to the display control unit 42 via the control line 90. In this way, the display control unit 42 performs the received display command using the received screen data so as to display the setting screen on the display unit 41. In this way, in Step S17, the main body control unit 20 controls the display control unit 42 to perform the operation for displaying the setting screen on the display unit 41 in accordance with the instruction to display the setting screen received by the instruction receiving unit 21.

In addition, when the power mode is one of the third sleep mode SM3, the second sleep mode SM2, and the first sleep mode SM1, it is supposed that the instruction receiving unit 21 has received the instruction to return to the ready mode RM (YES in S8, YES in S12, and YES in S16). In this case, the process of Step S1 and the following steps is repeated.

In this way, in the structure of the embodiment described above, when the current power mode is one of the three sleep modes SM1, SM2, and SM3, supply of the voltage V4 used by the display unit 41 and the display control unit 42 when the power mode is the ready mode RM is stopped.

In addition, the ready mode RM and the three sleep modes SM1, SM2, and SM3 have different numbers of voltages to be supplied, and hence the total number of voltages received by the four power receiving units 43a to 43d is different depending on which power mode the current power mode is. In this way, the light switching circuit 44 can switch between supply and non-supply of the voltage to each of the three light emitting elements 45a to 45c in accordance with the total number of voltages received by the four power receiving units 43a to 43d, namely, in accordance with which power mode the current power mode is.

In contrast, there is considered a structure in which a control line is disposed between the operation unit 4 and the main body control unit 20 so that the main body control unit 20 switches between supply and non-supply of the voltage to each of the light emitting elements in accordance with the current power mode via the control line (hereinafter referred to as Structure B). However, compared with Structure B, the structure of the embodiment described above can switch between supply and non-supply of the voltage to each of the three light emitting elements 45a to 45c in accordance with the current power mode with a simpler structure without the control line.

In this way, according to the structure of the embodiment described above, the voltage supply to the display unit 41 and the display control unit 42 can be stopped with a simpler structure than Structure B when the power mode is the sleep mode. In addition, with a simpler structure than Structure B, the user can recognize which power mode the current power mode is, in accordance with whether or not the voltage is supplied to each of the three light emitting elements 45a to 45c, namely whether or not each of the three light emitting elements 45a to 45c is turned on.

In addition, according to the structure of the embodiment described above, when the current power mode is the one sleep mode SM1 (SM2, SM3) among the three sleep modes SM1, SM2, and SM3, the voltage V1 (V2, V3) is supplied only to the light emitting element 45a (45b, 45c) corresponding to the sleep mode SM1 (SM2, SM3) in which voltages of the same number as the total number of the voltages received by the four power receiving units 43a to 43d are supplied, namely the current power mode SM1 (SM2, SM3), and hence the light emitting element 45a (45b, 45c) is turned on.

On the other hand, when the current power mode is the ready mode RM, the voltage is not supplied to any of the three light emitting elements 45a to 45c corresponding respectively to the three sleep modes SM1, SM2, and SM3, and hence no light emitting element is turned on.

In this way, the user can see the turned-on light emitting element so as to recognize that the sleep mode corresponding to the light emitting element is the current power mode. In addition, when no light emitting element is turned on, the user can recognize that the current power mode is the ready mode RM.

In addition, it is supposed that the power mode is the first power mode SM1 (SM2, SM3) as one of the three sleep modes SM1, SM2, and SM3. In this case, the power supply switching circuit 46a (46b, 46c) corresponding to the light emitting element 45a (45b, 45c) corresponding to the first power mode SM1 (SM2, SM3) operates as follows.

Specifically, the first power receiving unit P1a (P1b, P1c) receives the first voltage V1 (V2, V3) that is supplied both in the first power mode SM1 (SM2, SM3) and the second power mode SM2 (SM3, RM) having the number of supplied voltages, which is large next to the first power mode SM1 (SM2, SM3). The second power receiving unit P2a (P2b, P2c) does not receive the second voltage V2 (V3, V4) that is supplied in the second power mode SM2 (SM3, RM) but is not supplied in the first power mode SM1 (SM2, SM3). Thus, the switch element Qa (Qb, Qc) is turned off.

In this way, the current flowing when the first power receiving unit P1a (P1b, P1c) receives the first voltage V1 (V2, V3) does not flow to the switch element Qa (Qb, Qc) but flows to the light emitting element 45a (45b, 45c) corresponding to the first power mode SM1 (SM2, SM3), connected in parallel to the switch element Qa (Qb, Qc).

In other words, according to the structure of the embodiment described above, it is possible to supply the first voltage V1 (V2, V3) to the light emitting element 45a (45b, 45c) corresponding to the first power mode SM1 (SM2, SM3) as the current power mode, without disposing the control line necessary for the main body control unit 20 to perform the control for switching between supply and non-supply of the voltage to the light emitting elements 45a (45b, 45c).

In addition, according to the structure of the embodiment described above, when the power mode is the second power mode SM2 (SM3, RM), in the power supply switching circuit 46a (46b, 46c) corresponding to the light emitting element 45a (45b, 45c) corresponding to the first power mode SM1 (SM2, SM3), the first power receiving unit P1a (P1b, P1c) receives the first voltage V1 (V2, V3), and the second power receiving unit P2a (P2b, P2c) receives the second voltage V2 (V3, V4).

As a result, the switch element Qa (Qb, Qc) is not turned off, the current flowing when the first power receiving unit P1a (P1b, P1c) receives the first voltage V1 (V2, V3) flows to the switch element Qa (Qb, Qc) but does not flow to the light emitting element 45a (45b, 45c) corresponding to the first power mode SM1 (SM2, SM3), connected in parallel to the switch element Qa (Qb, Qc).

In other words, according to the structure of the embodiment described above, without disposing the control line necessary for the main body control unit 20 to control switching between supply and non-supply of the voltage to the each light emitting element 45a (45b, 45c), it is possible to stop supply of the first voltage V1 (V2, V3) to the light emitting element 45a (45b, 45c) corresponding to the first power mode SM1 (SM2, SM3) having the number of voltages supplied from the power supply unit 30, which is small next to the number of voltages supplied in the second power mode SM2 (SM3, RM) as the current power mode.

In addition, according to the structure of the embodiment described above, when the power mode is the ready mode RM, namely when the voltage V4 is supplied to the display unit 41 and the display control unit 42, the user can see the message M1 indicating that the power mode is the ready mode RM. In this way, the user after seeing the message M1 can easily recognize that the current power mode is the ready mode RM.

Further, the embodiment is merely an example of the embodiment according to the present disclosure, and it is not intended to limit the present disclosure to the embodiment. For instance, the following modified embodiment can be adopted.

(1) Instead of the structure of the embodiment described above in which the control program is executed to control the operations of the units, the main body control unit 20 may be constituted of an ASIC capable of performing the same control.

(2) It is possible not to display the message M1 indicating that the power mode is the ready mode RM in the operation screen W1.

(3) The number of the power supply lines used for voltage supply from the power supply unit 30 is not limited to four but may be n that is two or larger. In other words, the power supply unit 30 may supply two or more, i.e., n voltages. Together with this, the operation unit 4 may include n power receiving units.

Together with this, the number of the voltages used by the display unit 41 and the display control unit 42 when the power mode is the ready mode in which n voltages are supplied may be one or more to n−1 or less, i.e., m. Further, the switching unit 22 may switch the power mode to one of the ready mode and one or more to n−m or less, i.e., p sleep modes.

Further, p light emitting elements corresponding respectively to the p sleep modes may be provided to the operation unit 4, and the light switching circuit 44 may include the power supply switching circuits corresponding respectively to the p light emitting elements.

For instance, the structure of this modified embodiment can be realized by changing the structure of the embodiment described above with reference to FIGS. 1 to 5 (hereinafter referred to as a first embodiment) as described below. In the following description, a structural element corresponding to that in the structure of the first embodiment is denoted by the same numeral or symbol as that used in the description of the first embodiment. FIG. 6 is a diagram showing a correspondence relationship among the voltage supply states in the power modes and the states of power supply to the individual units in this modified embodiment.

For instance, the copier 1 in this modified embodiment includes three power supply lines L1 to L3. In other words, the power supply unit 30 supplies three voltages V1 to V3 (see FIG. 1). In other words, n is three. Together with this, the operation unit 4 includes the three power receiving units 43a to 43c (see FIG. 1). In addition, as shown in FIG. 6, the switching unit 22 supplies three voltages V1 to V3 when the power mode is the ready mode RM.

When the power mode is the ready mode RM, the display unit 41 operates using the voltage V2 supplied via the power supply line connected to the power receiving unit 43b, which is not shown in FIG. 1. When the power mode is the ready mode RM, the display control unit 42 operates using the voltage V3 supplied via the power supply line connected to the power receiving unit 43c, which is not shown in FIG. 1. In other words, the display unit 41 and the display control unit 42 use the total two voltages V2 and V3 when the power mode is the ready mode RM. In other words, m is two.

Together with this, as shown in FIG. 6, the switching unit 22 switches the power mode to one of the sleep mode SM1 in which supply of the two voltages V2 and V3 is stopped and the one voltage V1 is supplied and the ready mode RM. In other words, p is one.

Together with this, the operation unit 4 includes only the one light emitting element 45a corresponding to the one sleep mode SM1 (see FIG. 1). In addition, the light switching circuit 44 includes only the one power supply switching circuit 46a corresponding to the one light emitting element 45a (see FIG. 2). The first power receiving unit P1a is connected to the power receiving unit 43a, and the second power receiving unit P2a is connected to the power receiving unit 43b. Note that the power receiving unit 43c is connected to the display control unit 42 but is not connected to the light switching circuit 44.

In Step S2 of this modified embodiment, in the power supply switching circuit 46a, the first power receiving unit P1a receives the voltage V1 via the power receiving unit 43a, and the second power receiving unit P2a receives the voltage V2 via the power receiving unit 43b (see FIG. 2). In this way, a voltage obtained by dividing the received voltage V2 by the two resistors R2a and R3a in the second power receiving unit P2a is applied to the base of the switch element Qa, so that the switch element Qa is turned on allowing current flow. As a result, the current flowing when the first power receiving unit P1a receives the voltage V1 flows to the ground via the resistor R1a and the switch element Qa, and the current does not flow to the light emitting element 45a. In this way, the power supply switching circuit 46a stops voltage supply to the light emitting element 45a.

In addition, in the switching operation of the power mode in this modified embodiment, Steps S6 to S13 are omitted (see FIG. 4).

In other words, in the case where the power mode of the copier 1 is the ready mode RM, when a predetermined time T1 has elapsed (YES in S5) without any instruction received by the instruction receiving unit 21 (NO in S4), the switching unit 22 switches the power mode of the copier 1 to the first sleep mode SM1 (FIG. 6) (S14).

In Step S15 of this modified embodiment, the first power receiving unit P1a receives the voltage V1, but the second power receiving unit P2a does not receive the voltage V2. In this way, a voltage is not applied to the base of the switch element Qa, and the switch element Qa is turned off. As a result, the current flowing when the first power receiving unit P1a receives the voltage V1 flows to the light emitting element 45a via the resistor R1a. In this way, in Step S15, the power supply switching circuit 46a supplies the voltage V1 received by the first power receiving unit P1a to the light emitting element 45a via the resistor R1a.

In other words, in the power supply switching circuit 46a of this modified embodiment, the first power receiving unit P1a is connected to the power receiving unit 43a so as to receive the voltage V1 (first voltage), which is supplied both in the first sleep mode SM1 (first power mode) corresponding to the light emitting element 45a corresponding to the power supply switching circuit 46a, and in the ready mode RM (second power mode) having the number of voltages supplied from the power supply unit 30, which is large next to the number of voltages supplied in the first sleep mode SM1. On the other hand, the second power receiving unit P2a is connected to the power receiving unit 43b so as to receive the voltage V2 (second voltage) that is supplied in the ready mode RM but is not supplied in the first sleep mode SM1.

Note that the second power receiving unit P2a may be connected to the power receiving unit 43c so as to receive the voltage V3 (second voltage) that is supplied in the ready mode RM but is not supplied in the first sleep mode SM1. Together with this, the power receiving unit 43b may be connected only to the display unit 41 without being connected to the light switching circuit 44.

As described above, in the power mode display method of the present disclosure, among the p light emitting elements disposed corresponding to the p sleep modes of the image forming apparatus having a plurality of power modes including the ready mode RM in which the power supply unit 30 supplies the n voltages, and the p sleep modes in which one or more voltages among the n voltages are not supplied, only the light emitting element corresponding to the sleep mode in which the power supply unit 30 supplies voltages of the same number as the total number of the voltages received by the n power receiving units is supplied with the received voltage so as to emit light.

Thus, according to the present disclosure, compared with the structure in which the control line is disposed between the operation unit 4 and the main body control unit 20 so that the main body control unit 20 switches between supply and non-supply of the voltage to the light emitting element via the control line in accordance with the current power mode (Structure A), the relatively simple structure enables to stop voltage supply to the display unit 41 and the display control unit 42 when the power mode is the sleep mode. In addition, the user can recognize which power mode the current power mode is, in accordance with whether or not the voltage is supplied to the light emitting element, namely whether or not the light emitting element is turned on.

In other words, it is preferred that the operation unit 4 provided to the image forming apparatus of the present disclosure includes the p light emitting elements corresponding respectively to the p sleep modes, and the light switching circuit 44 supplies the received voltage only to the light emitting element corresponding to the sleep mode in which the power supply unit 30 supplies the voltages of the same number as the total number of the voltages received by the n power receiving units among the p light emitting elements. According to this structure, when the current power mode is one of the p sleep modes, only the light emitting element, which corresponds to the current power mode, namely the sleep mode in which the voltages of the same number as the total number of the voltage received by the n power receiving units are supplied, is supplied with the voltage so that the light emitting element emits light.

On the other hand, when the current power mode is the ready mode RM, the voltage is not supplied to any of the p light emitting elements corresponding respectively to the p sleep modes, and hence no light emitting element is turned on. Accordingly, the user can see the turned-on light emitting element so as to recognize that the sleep mode corresponding to light emitting element is the current power mode. In addition, when no light emitting element is turned on, the user can recognize that the current power mode is the ready mode RM.

In addition, the light switching circuit 44 includes the p power supply switching circuits corresponding respectively to the p light emitting elements. Each of the p power supply switching circuits includes the first power receiving unit configured to receive the first voltage, which is supplied both in the first power mode as the sleep mode corresponding to the light emitting element corresponding to the power supply switching circuit and in the second power mode having the number of voltages supplied from the power supply unit 30, which is large next to the number of voltages supplied in the first power mode. The first power receiving unit is connected in series to the light emitting element corresponding to the power supply switching circuit, and may further include the second power receiving unit configured to receive the second voltage that is supplied in the second power mode but is not supplied in the first power mode, and the switch element connected in parallel to the light emitting element corresponding to the power supply switching circuit, so as to be turned off and to supply the current to the light emitting element when the second power receiving unit does not receive the second voltage.

According to this structure, when the power mode is the first power mode, in the power supply switching circuit corresponding to the light emitting element corresponding to the first power mode, the first power receiving unit receives the first voltage, and the second power receiving unit does not receive the second voltage. For this reason, the switch element of the power supply switching circuit is turned off, and the current flowing when the first power receiving unit receives the first voltage does not flow to the switch element but flows to the light emitting element corresponding to the first power mode, connected in parallel to the switch element.

In other words, according to this structure, without disposing the control line necessary for the main body control unit 20 to control switching between supply and non-supply of the voltage to the each light emitting element, it is possible to supply the first voltage to the light emitting element corresponding to the first power mode as the current power mode.

In addition, according to this structure, when the power mode is the second power mode, in the power supply switching circuit corresponding to the light emitting element corresponding to the first power mode, the first power receiving unit receives the first voltage, and the second power receiving unit receives the second voltage. Thus, the switch element of the power supply switching circuit is not turned off, and the current flowing when the first power receiving unit receives the first voltage flows to the switch element and does not flow to the light emitting element corresponding to the first power mode, connected in parallel to the switch element.

In other words, according to this structure, without disposing the control line necessary for the main body control unit 20 to control switching between supply and non-supply of the voltage to the each light emitting element, it is possible to stop supply of the first voltage to the light emitting element according to the first power mode having the number of voltages supplied from the power supply unit 30, which is small next to the number of voltages supplied in the second power mode as the current power mode.

In addition, when the switching unit 22 switches the power mode to the ready mode RM, the main body control unit 20 may control the display control unit 42 to display a message indicating that the power mode is the ready mode RM on the display unit 41. According to this structure, when the power mode is the ready mode, namely when the voltage is supplied to the display unit 41 and the display control unit 42, the user can see the message indicating that the power mode is the ready mode RM. In this way, the user after seeing the message can easily recognize that the current power mode is the ready mode RM.

As described above, according to the present disclosure, it is possible to provide the image forming apparatus and the power mode display method, which can stop voltage supply to the display unit and the display control unit when the power mode is the sleep mode, and enables the user to recognize the current power mode, with a simple structure.

What is claimed is:

1. An image forming apparatus comprising:
an operation unit including a display unit and a display control unit configured to control information display on the display unit;
an image forming unit configured to form an image on a paper sheet;
a main body control unit configured to control operations of the image forming unit and the operation unit; and
a power supply unit capable of individually supplying two or more, i.e., n voltages, wherein
the main body control unit includes a switching unit configured to switch a power mode of the image forming apparatus to one of power modes including a ready mode in which the power supply unit supplies the n voltages, and one or more to n–m or less, where m is an integer of one or more but less than n, i.e., p sleep modes in which the power supply unit does not supply m voltages used by the display unit and the display control unit when the power mode is the ready mode while the power supply unit supplies one or more to n–m or less different number of voltages,
the operation unit includes a light emitting element, n power receiving units configured to respectively receive the n voltages, and a light switching circuit configured to switch between supply and stop of the received voltage to the light emitting element in accordance with a total number of the voltages received by the n power receiving units, and
of the n voltages, one voltage is a voltage that the power supply unit supplies constantly and other voltages than the one voltage are voltages that the power supply unit supplies to the image forming unit and that the power supply unit does not supply in the sleep modes, and of the other voltages that the power supply unit does not supply in the sleep modes, m voltages are voltages that the display unit and the display control unit use.

2. The image forming apparatus according to claim 1, wherein
the operation unit includes p light emitting elements corresponding respectively to the p sleep modes, and the light switching circuit supplies the received voltage only to the light emitting element corresponding to the sleep mode in which the power supply unit supplies voltages of the same number as the total number of the voltages received by the n power receiving units, among the p light emitting elements.

3. The image forming apparatus according to claim 2, wherein
the light switching circuit includes p power supply switching circuits corresponding respectively to the p light emitting elements, and
each of the p power supply switching circuits includes
a first power receiving unit configured to receive a first voltage, which is supplied both in a first power mode as the sleep mode corresponding to the light emitting element corresponding to the power supply switching circuit, and in a second power mode having the number of voltages supplied from the power supply unit, which is large next to the number of voltages supplied in the first power mode, the first power receiving unit being connected in series to the light emitting element corresponding to the power supply switching circuit,
a second power receiving unit configured to receive a second voltage that is supplied in the second power mode but is not supplied in the first power mode, and
a switch element connected in parallel to the light emitting element corresponding to the power supply switching circuit, the switch element being turned off when the second power receiving unit does not receive the second voltage so as to supply current to the light emitting element.

4. The image forming apparatus according to claim 1, wherein when the switching unit switches the power mode to the ready mode, the main body control unit controls the display control unit to display a message indicating that the power mode is the ready mode on the display unit.

5. The image forming apparatus according to claim 3, wherein when the switching unit switches the power mode to the ready mode, the main body control unit controls the display control unit to display a message indicating that the power mode is the ready mode on the display unit.

6. A method of displaying a power mode of an image forming apparatus, the method comprising the steps of:
allowing the image forming apparatus
to have a plurality of power modes including a ready mode in which a power supply unit supplies two or more, i.e., n voltages;
switching among the power modes to one of the power modes including the ready power mode, and one or more to n−m or less, where m is an integer of one or more but less than n, i.e., p sleep modes in which the power supply unit does not supply m voltages used by a display unit and a display control unit when the power mode is in the ready mode while the power supply unit supplies one or more to n−m or less different number of voltages; and
switching between supply and stop of a received voltage to a light emitting element in accordance with a total number of voltages received by n power receiving units configured to respectively receive the n voltages;
wherein of the n voltages, one of voltage is a voltage that the power supply unit supplies constantly and other voltages than the one voltage are voltages that the power supply unit supplies to the image forming unit and that the power supply unit does not supply in the sleep modes, and of the other voltages that the power supply unit does not supply in the sleep modes, m voltages are voltages are voltages that the display unit and the display control unit use.

7. The image forming apparatus according to claim 3, wherein
n equals 4 such that there are four voltages,
m equals 1 such that one voltage is supplied to the display unit and the display control unit,
p equals 3 such that there are three sleep modes,
the three sleep modes comprise
a first sleep mode in which the power supply unit supplies, of the four voltages, only one voltage which is a first voltage but does not supply the other three voltages,
a second sleep mode in which the power supply unit supplies, of the four voltages, two voltages which are a first voltage and a second voltage but does not supply the other two voltages, and
a third sleep mode in which the power supply unit supplies, of the four voltages, three voltages which are a first voltage, a second voltage, and a third voltage but does not supply the remaining one voltage which is a fourth voltage, and
the fourth voltage that is not supplied in any of the first, second, and third sleep modes is a voltage that the display unit and the display control unit use.

8. The image forming apparatus according to claim 7, wherein
the light emitting element comprises a first light emitting element which is supplied with, of the four voltages, the first voltage,
the switch element comprises a first switch element which is connected in parallel with the first light emitting element and which is off when not being supplied with the second voltage,
in the first sleep mode, the power supply unit supplies, of the four voltages, the first voltage but does not supply any of the second, third, and fourth voltages so that, via the first switch element, the first light emitting element is lit by the first voltage.

9. The image forming apparatus according to claim 7, wherein
the light emitting element comprises a second light emitting element which is supplied with, of the four voltages, the second voltage,
the switch element comprises a second switch element which is connected in parallel with the second light emitting element and which is off when not being supplied with the third voltage,
in the second sleep mode, the power supply unit supplies, of the four voltages, the first and second voltages but does not supply either of the third and fourth voltages so that, via the second switch element, the second light emitting element is lit by the second voltage.

10. The image forming apparatus according to claim 7, wherein
the light emitting element comprises a third light emitting element which is supplied with, of the four voltages, the third voltage,
the switch element comprises a third switch element which is connected in parallel with the third light emitting element and which is off when not being supplied with the fourth voltage,
in the third sleep mode, the power supply unit supplies, of the four voltages, the first, second, and third voltages but does not supply the fourth voltage so that, via the third switch element, the third light emitting element is lit by the third voltage.

* * * * *